US005714080A

United States Patent [19]

Kuo et al.

[11] Patent Number: 5,714,080

[45] Date of Patent: Feb. 3, 1998

[54] SELF-ACTUATING MOLDS FOR VERTICALLY CASTING CONCRETE PIPE

[75] Inventors: Ming C. Kuo, Cerritos; Paul Kubat, La Mirada, both of Calif.

[73] Assignee: Ameron International Corporation, Pasadena, Calif.

[21] Appl. No.: 435,885

[22] Filed: May 5, 1995

[51] Int. Cl.$^6$ .......... B22C 13/10; B29C 33/20; B29C 41/40

[52] U.S. Cl. .......... 249/63; 249/152; 249/153; 249/178; 249/179

[58] Field of Search .......... 249/152, 153, 249/178, 179, 180, 63

[56] References Cited

U.S. PATENT DOCUMENTS

| | | | |
|---|---|---|---|
| Re. 13,106 | 4/1910 | Clark | 249/179 |
| 310,859 | 1/1885 | Ead | 249/153 |
| 822,040 | 5/1906 | Besser | 249/108 |
| 950,567 | 3/1910 | Kesling | 249/152 |
| 981,557 | 1/1911 | Harrell | 249/153 |
| 1,397,649 | 11/1921 | Mitchell | 249/179 |
| 1,757,487 | 5/1930 | Soule | 249/179 |
| 1,997,232 | 4/1935 | Richards | 249/185 |
| 2,683,912 | 7/1954 | Serrell | 249/178 |
| 2,966,714 | 1/1961 | Eways et al. | 25/30 |
| 3,164,877 | 1/1965 | Lee | 25/128 |
| 3,570,802 | 3/1971 | Miller | 249/152 |
| 3,656,732 | 4/1972 | St. John | 249/152 |
| 4,134,568 | 1/1979 | Christian | 249/118 |
| 4,153,232 | 5/1979 | Burchett | 249/179 |
| 4,582,275 | 4/1986 | Ives | 242/110 |
| 5,139,404 | 8/1992 | Grau | 249/152 |
| 5,417,519 | 5/1995 | Smuts | 249/152 |

*Primary Examiner*—Thomas R. Weber
*Attorney, Agent, or Firm*—Christie, Parker & Hale, LLP

[57] ABSTRACT

A gated mold for casting concrete pipe requires no wedges or bolts for securement. A core mold may be contracted by lifting at an actuation point, and expanded by resting on a base ring. An external mold may be expanded by lifting at an actuation point, and contracted by resting on a base ring. The mold gates are opened and closed with sets of collapsing links pivotably attached to a longitudinally extending actuation column. Longitudinal motion of the actuation column forces the links to collapse or extend, thereby expanding or contracting the mold. Appropriately positioned actuation and lifting points are provided such that the mold can be lifted vertically along the longitudinal axis containing the mold center of gravity.

36 Claims, 11 Drawing Sheets

SELF-ACTUATING MOLDS FOR VERTICALLY CASTING CONCRETE PIPE

BACKGROUND

In the casting of concrete pipes, two mold forms must be used. First, a cylindrical "core" mold must be utilized which defines the inner radius of the pipe. Second, an outer mold must be utilized which defines the outer radius of the pipe. Concrete is poured between these two molds, is allowed to set, and the molds are removed. Typically, these molds are made from heavy gauge sheet metal. To allow the stripping of the molds from the cast concrete after it has set, the molds are split longitudinally, which allows them to contract or expand to a certain extent. When in use, the molds are held secure in a cylindrical shape while the concrete sets. After setting, the molds are released, the outer core is expanded, the inner core is contracted, and the molds are stripped.

Much effort has been devoted to creating concrete pipe molds which can be stripped from the cast pipe in a convenient manner. Most work has been spent devising contractible core molds. U.S. Pat. No. 822,040, for instance, discloses a split cylindrical core mold with overlapping edges. On the inside surface of the mold on both sides of the line of overlap are provided brackets which are forced apart when a wedge is inserted between them. This forces a decrease in the amount of overlap, expanding the mold body. After the concrete sets, the wedge may be removed, collapsing the mold body, and allowing its removal from the center of the cast pipe.

Other methods of collapse have been used with the same type of overlapping sheet metal mold. U.S. Pat. No. 981,557 describes a device which incorporates screw driven collapsing linkage which is attached to the inner surface of a core mold such that rotating the screw will increase or decrease the amount of edge overlap, thereby increasing or decreasing the size of the core. U.S. Pat. No. 1,757,487 discloses pivoting radial arms extending outwardly from a central longitudinal shaft to the inner surface of the core mold body. When the central shaft is moved longitudinally, the pivoting arms increase and decrease in radial extension with a resulting increase and decrease in the radius of the core.

Configurations in which the edges of the split core do not overlap when in use have also been devised. U.S. Pat. No. 1,997,232 discloses a core mold with two nearly semi-cylindrical halves, hinged together along one set of adjacent edges. A complete cylindrical mold is formed when a filler plate is extended via a centrally located actuating rod to fill a gap which exists on the mold surface opposite from the hinged edges.

More recently created molds use rigid strips called "gates" welded along the edges of the split cylinder. The gates have complementary surfaces which mate when the split cylinder is expanded to form the core mold. Such a system is described in U.S. Pat. No. 3,164,877. Although gate type systems provide strong and virtually seamless core molds, the gates are typically held in place with wedges and other hardware, rendering it laborious to open the gate to collapse the mold.

Outer molds can also be laborious to expand when stripping because the gate seam is typically held in place with many bolts, all of which need to be installed and removed with each use.

It is desirable to provide a mold structure adaptable to either inner or outer molds which is easily and quickly made round to form an inner or outer mold for concrete pipe. Desirably, such a mold can be opened (enlarged in the case of an outer mold or collapsed in the case of an inner mold) by the simple act of lifting the mold. Concrete pipe is normally cast with a vertical axis and it would be desirable to have a mold that could be formed into a cylinder when set down and opened when lifted.

SUMMARY OF THE INVENTION

There is, therefore, provided in practice of this invention according to a presently preferred embodiment, a mold for casting concrete pipe sections comprising an approximately cylindrical body of sheet metal with a longitudinal split forming spaced apart left and right edges. Substantially rigid strips are secured longitudinally along each edge forming left and right gates. A longitudinally extending actuating column is used for moving the gates via a plurality of collapsing links. One end of each link is pivotably attached to the actuating column for collapsing and extending the linkage when the actuating column is moved longitudinally. The extension of the linkage forces the closure of the gates and the collapse of the linkage allows the opening of the gates. This mold may be made such that the links collapse when the mold is lifted by the actuating column, and the links extend when the mold rests vertically on its lower end.

There is an actuation point which may located on the actuating column when the actuating column is located substantially along the longitudinal axis containing the center of gravity of the mold. The actuation point may be located on a connecting arm pivotably connected to both the actuating column and the mold body, the connecting arm intersecting the longitudinal axis containing the center of gravity of the mold, with the actuation point being located substantially at the intersection. This mold may also comprise a plurality of lifting points, one of which is the actuation point, the actuation point being located on the actuating column, the lifting points being positioned substantially symmetrically around the mold body. This is particularly suitable for an outer mold. Also, the gates may comprise mating surfaces which abut each other when the mold is prepared for casting a pipe. Means may be provided for adjusting the length of a link after mold assembly.

An inner core mold for casting concrete pipe sections comprises an approximately cylindrical body of sheet metal with a longitudinal split forming left and right edges with substantially rigid strips secured longitudinally along each edge to form left and right gates with facing non-abutting surfaces. A longitudinally extending gate column has left and right mating surfaces, the left surface being complementary to the left gate, the right surface being complementary to the right gate. An actuating column extends longitudinally along the mold. An actuation point is used for moving the actuating column. A longitudinally extending backbone is secured to the inner surface of the mold, approximately diametrically opposed to the edges. The backbone is moved by a plurality of collapsing links. A first link is pivotably attached to both the gate column and the actuating column and a second link is pivotably attached to both the backbone and the actuating column. The linkages collapse when the actuating column is moved longitudinally in one direction, and extend when the actuating column is moved longitudinally in the other direction. The mating surfaces of the gate column are engaged to the left and right gate surfaces when the links are in the extended position and are disengaged from the left and right gate surfaces when the links are in the collapsed position.

The links may be made to collapse when the mold is lifted by the actuation point, and the links may be made to extend when the mold rests vertically on the end opposite the actuation point. Also, the actuation point may be located on the actuating column when the actuating column is located substantially along the longitudinal axis containing the center of gravity of the mold.

A core mold for casting concrete pipe sections comprises an approximately cylindrical body of sheet metal with a longitudinal split forming left and right edges each of which includes a longitudinally extending, substantially rigid strip with complementary abutting faces along each edge to form left and right gates. A longitudinally extending actuating column and an actuation point for moving the actuating column operate a plurality of collapsing links. A first link is pivotably attached to both the left gate and the actuating column and a second link is pivotably attached to both the right gate and the actuating column. The linkages collapse when the actuating column is moved longitudinally in one direction and extend when the actuating column is moved longitudinally in the other direction, the complementary faces being engaged when the links are extended and being disengaged when the links are collapsed.

In an external mold for casting concrete pipe sections complementary abutting faces disengage when the links collapse, and engage when the links extend. Such a mold may also comprise a plurality of lifting points positioned substantially symmetrically around the mold body, one of which is the actuation point.

BRIEF DESCRIPTION OF THE DRAWINGS

FIG. 1 shows several views of a core mold embodying the invention.

FIG. 2 shows several views of a different core mold also embodying the invention.

FIG. 3 shows several views of an external mold embodying the invention.

DETAILED DESCRIPTION

Figure 1A:
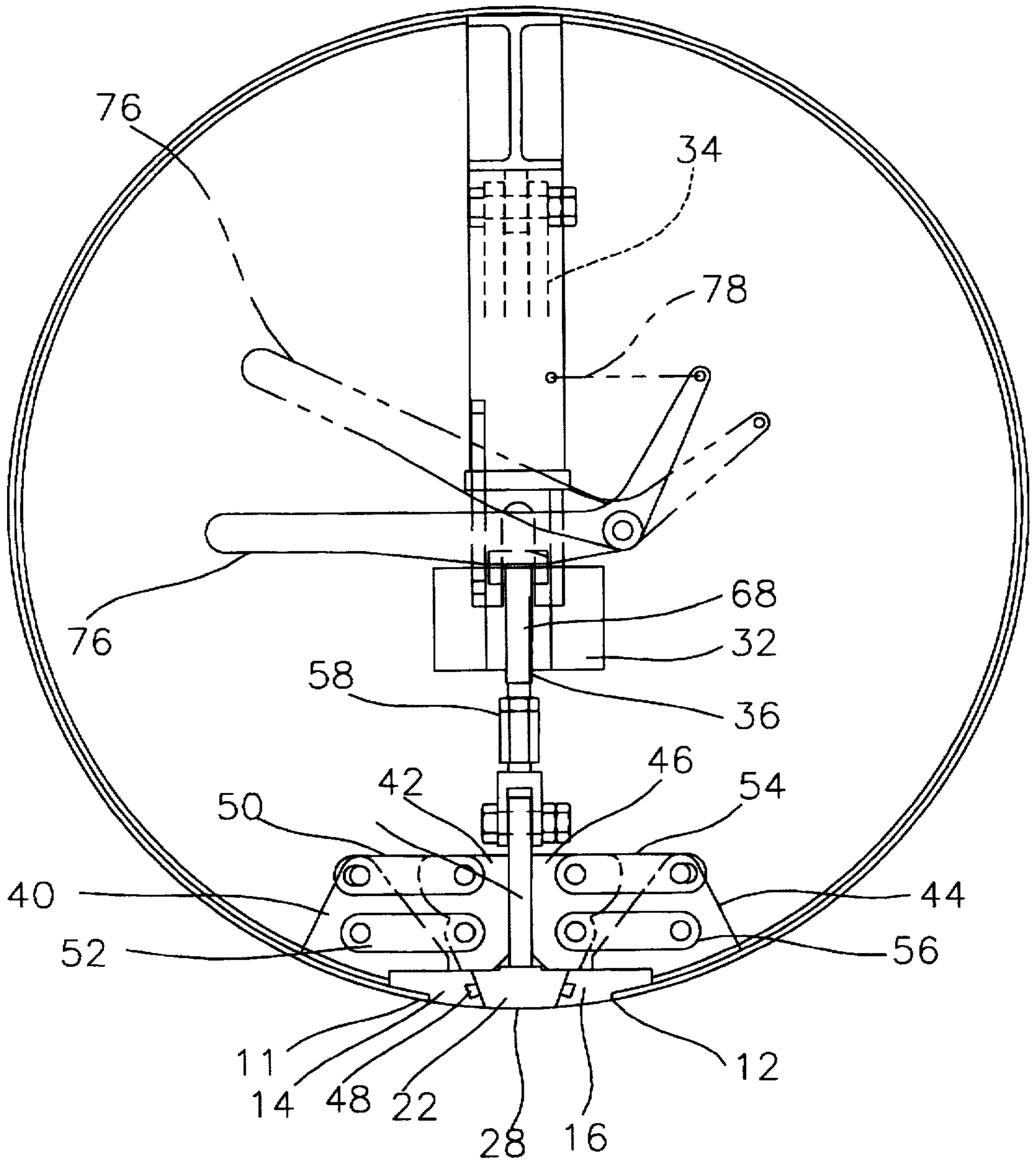
FIG. 1A shows a top view of the mold with the gate closed.

It is often convenient to cast concrete pipe vertically, the casting method addressed by the invention. In vertical casting, the pipe is formed with its central axis vertical. The outer and core molds are therefore also vertical, comprising two substantially concentric and approximately cylindrical pieces of sheet metal, typically steel. For large diameter pipe the sheets may be six millimeters or more thick. The two molds rest on a metal base ring. After casting, it is convenient to remove the molds vertically, lifting them off of the base ring and up over the top of the cast pipe. Prior to lifting, the outer mold must be expanded and the core mold must be contracted to break them away from their respective concrete surfaces.

Currently, gated molds require the removal of bolts, wedges, or other hardware in order to open the gate and separate the molds from the pipe surface so they can be lifted off of the cast pipe. What is needed, therefore, are gated molds which are easily set up in preparation for casting a pipe, as well as easily stripped from the cast pipe after it has been formed. Preferably, such gated molds should provide means by which the lifting process itself forces the appropriate expansion or collapse of the mold, and the resting of the mold on the base ring in preparation for pipe formation forces the restoration of the mold to the proper shape for pipe casting.

FIGS. 1A–1D illustrate a core mold with these desirable features. This embodiment comprises an approximately cylindrical piece of sheet steel 10 with a narrow (relative to the circumference) longitudinal split. It is as if a strip of metal from a complete cylinder was omitted. The absence of this strip forms left and right edges 11, 12 parallel to the mold central axis. When the cylindrical sheet is in a relaxed state, it deforms slightly, and the two edges are closer together than they are when the mold contour is forced into the shape it would have if an omitted strip were in place.

Welded onto the mold inner surface along each edge are left and right gates 14, 16 of thicker steel, which run the length of the mold and which extend somewhat beyond the edges of the sheet. The width of the gates is such that when the mold body is in its relaxed state, they almost bridge the gap between the edges. The gates are contoured on their outer surface with a recess substantially equal in depth to the thickness of the sheet steel comprising the mold, such that the vertical seam created by the gate/mold overlap is minimized. In addition, the outer surface of that portion of each gate which extends beyond the edge of the sheet steel is contoured to continue the approximately cylindrical surface formed by the mold body. Thus, the outside surface of the mold is a substantially smooth cylinder when the gates are closed. The gate inner surfaces are substantially flat.

The gates also have mating surfaces 18, 20 which angle apart from each other such that in the relaxed state, the gates nearly touch at their outer surfaces, but are farther apart at their inner surfaces. If the mold contour is forced into its original cylindrical shape, the effect is to leave a gap between the gates which extends the length of the mold, and has a trapezoidal cross section which is thinner at the outer surface of the gates, and thicker at the inner surface of the gates. To cast a pipe with a gated core mold of this type, the mold is expanded to its original cylindrical shape, and an appropriately sized longitudinally extending wedge, called a gate column, is secured into the above mentioned gap.

To prevent leakage of wet concrete into the interior of the core mold, it is preferable to provide seals on the mating surfaces of the gates or the gate column. After the pipe is cast, the gate column is removed, the mold contracts into its relaxed state and is then taken out of the pipe. The apparatus by which the core mold is expanded/contracted and the gate column is installed/removed is next described.

In this embodiment, a gate column 22 with a trapezoidal transverse cross section is provided adjacent to and radially inward from the gate opening. The gate column has left and right mating surfaces 24, 26 angled to be complementary to the mating surfaces 18, 20 of the left and right gates, respectively. The gate column outer surface 28 is contoured such that the cylindrical shape is continuous from left to right across both the gates and the gate column when the mold is in the expanded position and the gate column is mated to the gates.

To change from a contracted to an expanded shape, the gates must be separated, and the gate column must be forced radially outward into the gate opening. The gate column is forced outwardly with a plurality of collapsing linkages 60 which attach the gate column to a rigid backbone structure 30 secured to the interior surface of the mold body opposite from the gate opening. This connection is made through a longitudinally extending actuating column 32 such that lowering the column 32 extends the collapsing linkages, thereby pushing the gate column away from the backbone 30 and towards the gate opening. There are such linkages spaced conveniently along the length of the mold sufficient to keep the structure straight and rigid.

Each collapsing linkage comprises two column links 34, 36 one end of each link being pivotably connected at a common point on the actuating column 32. The other end of a rear column link 34 is pivotably connected to the backbone 30, whereas the other end of a front column link 36 is pivotably connected to a vertical flange 38 attached to the rear of the gate column. When the gate column is in its outer position mated against the gates, the column links are approximately in line with each other as seen in FIG. 1D. In this way, when the actuating column 32 is raised, each linkage collapses, that is, the links, instead of being in line with each other are at an angle as seen in FIG. 1C. This raising of the actuating column and collapsing of the column linkage pulls the gate column away from the gate opening. When the actuating column is lowered, each linkage extends, forcing the gate column away from the backbone and toward the gate opening.

At the same time that the gate column is being forced towards the gate opening by the extending linkages, the gates themselves need to be pushed apart to force the mold into its expanded cylindrical shape. This is accomplished by having sets of pivoting gate links connecting the gate column to the gates. These links pivot in planes transverse to the mold central axis so that gate column motion toward the gate opening pushes the two gates apart. Preferably, there is one set of gate links for each set of collapsing linkages, a set of gate links being axially aligned with each collapsing linkage such that both lie in the same transverse plane when the collapsing linkage is extended.

Figure 1B:
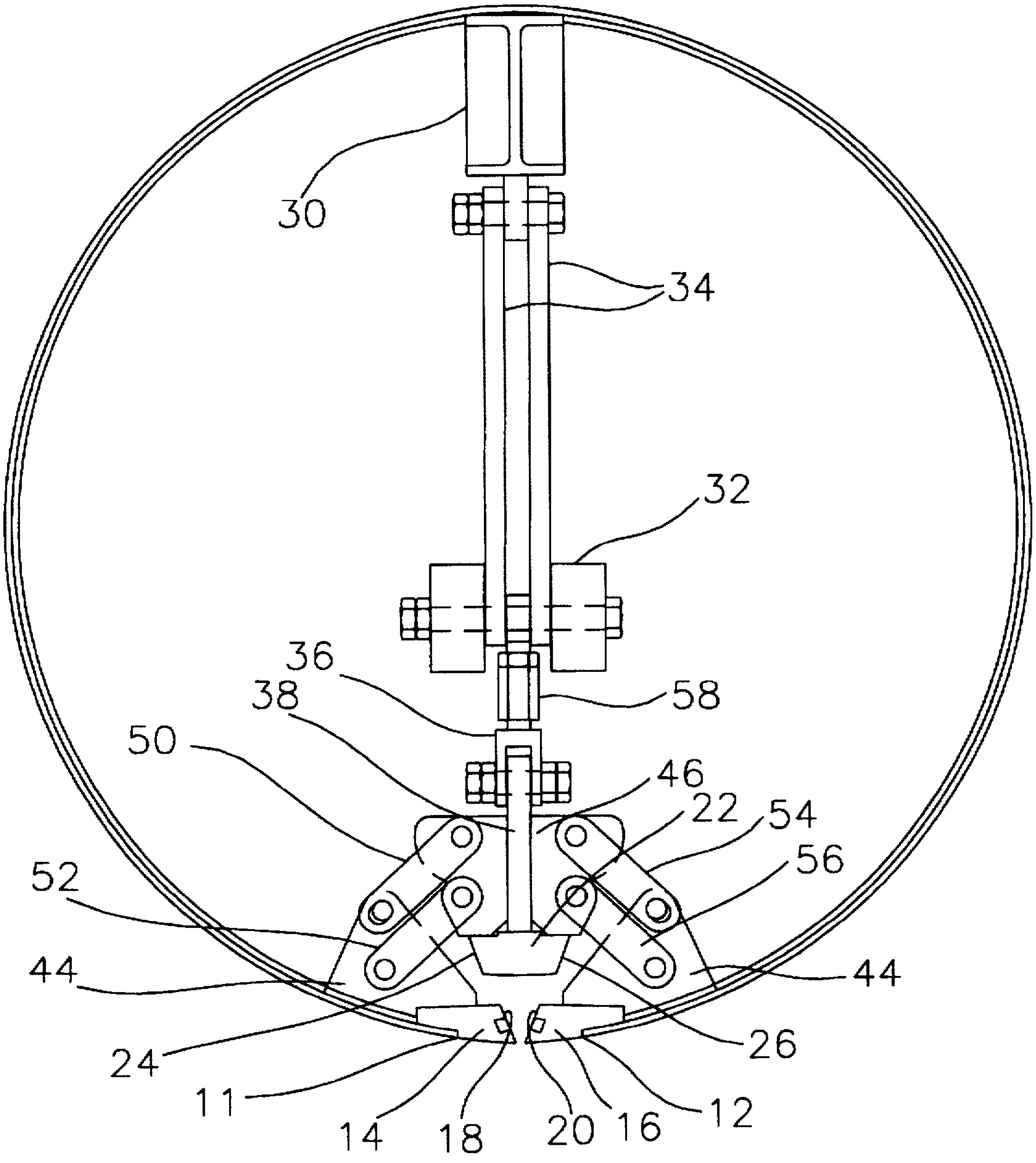
FIG. 1B shows a top view with the gate open, a portion of the structure at the top of the mold omitted to show underlying structure.
Figure 1C:
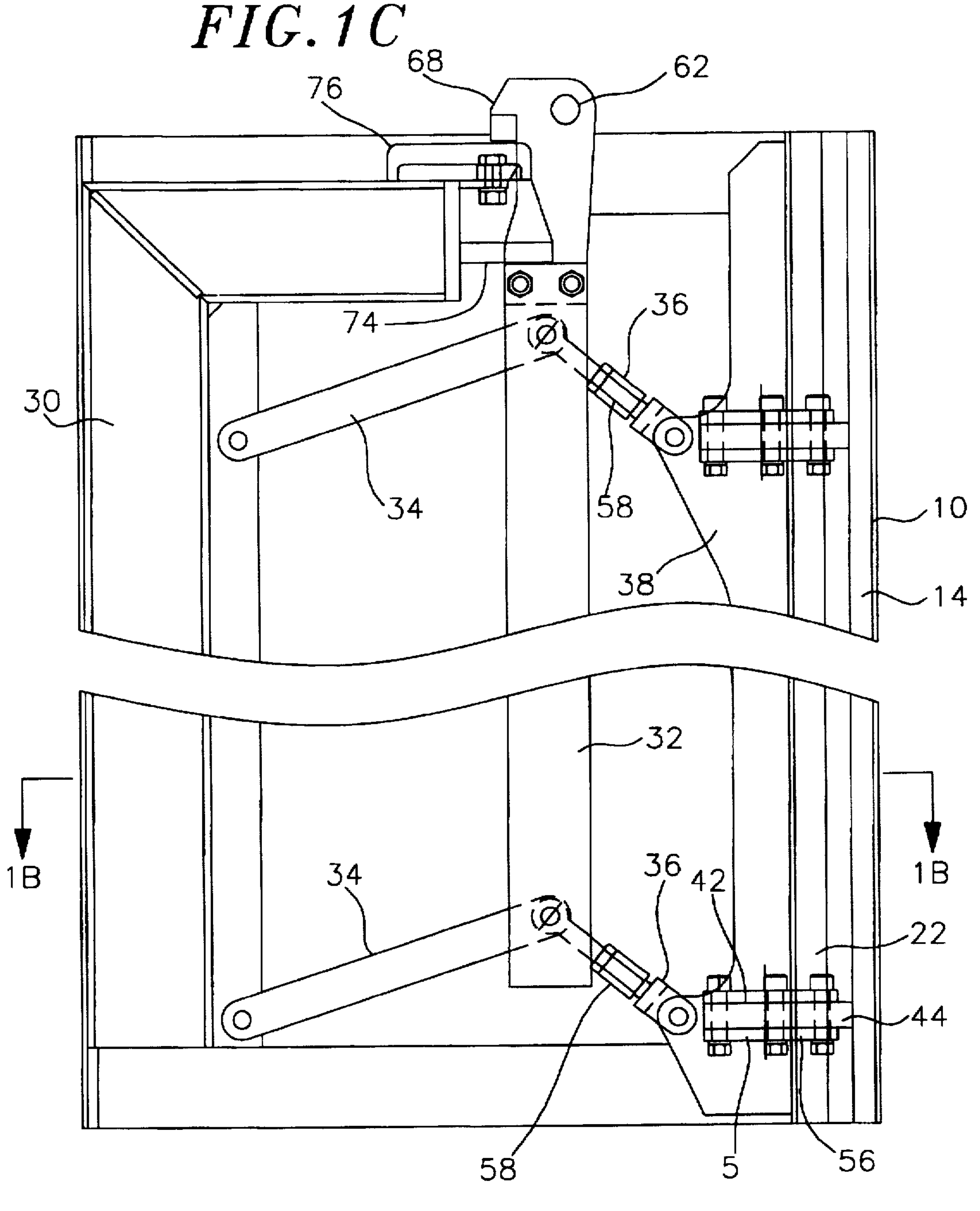
FIG. 1C is, in effect, a longitudinal cross section of the mold, showing the collapsing links in the collapsed position.
Figure 1D:
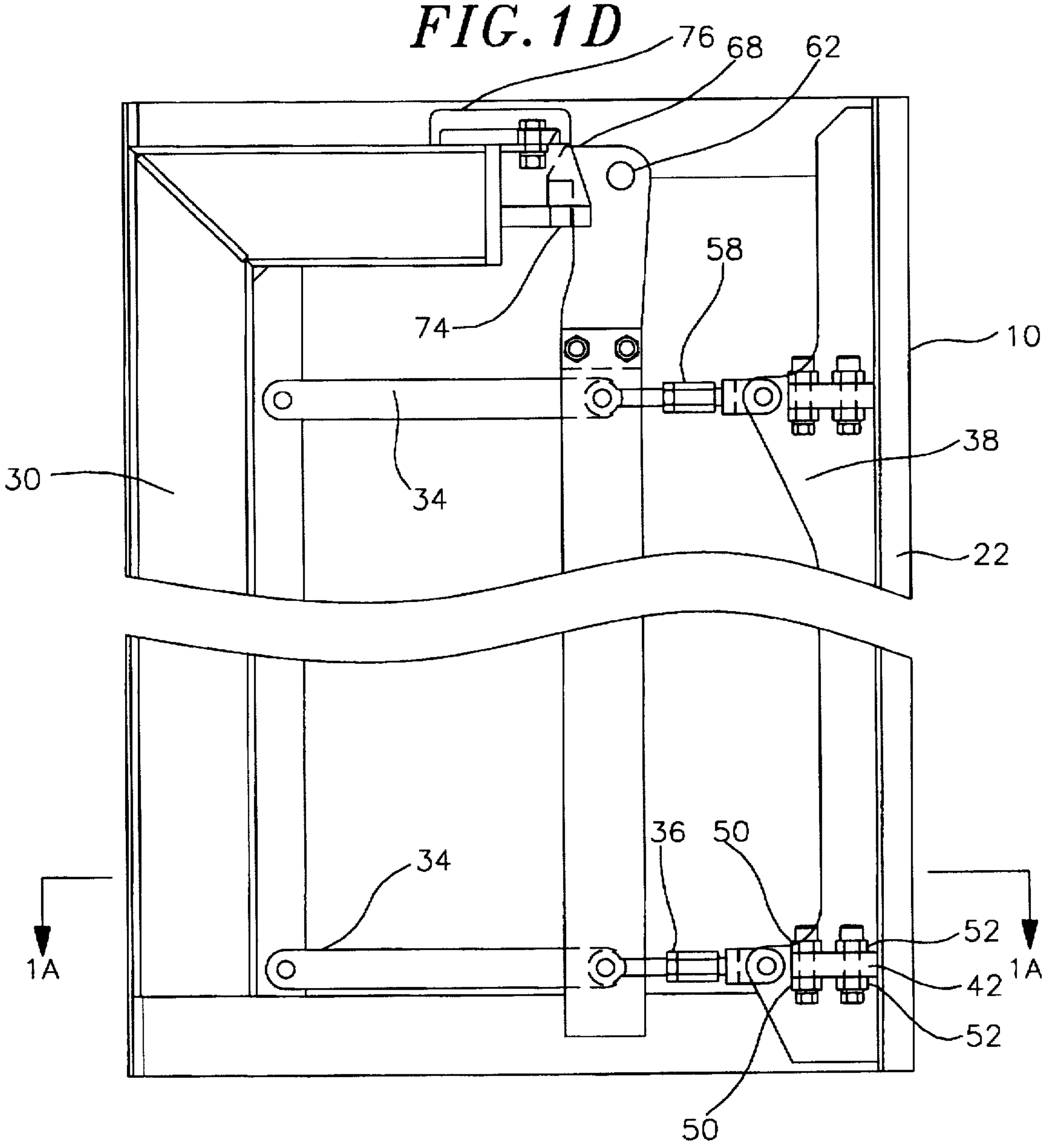
FIG. 1D shows the same longitudinal cross section with the links in the extended position.
Figure 2A:
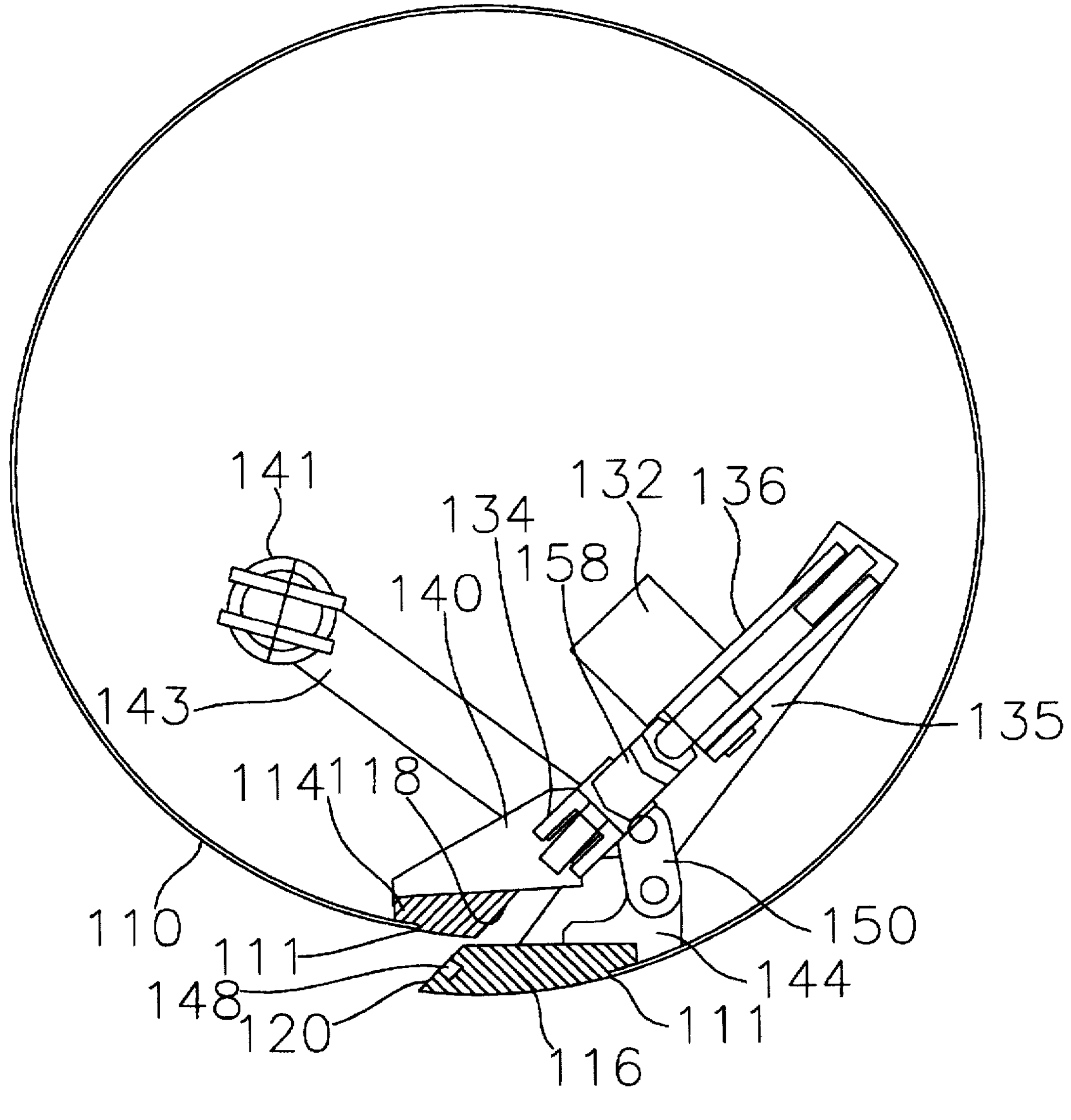
FIG. 2A shows a top view of the mold with the gate open.
Figure 2B:
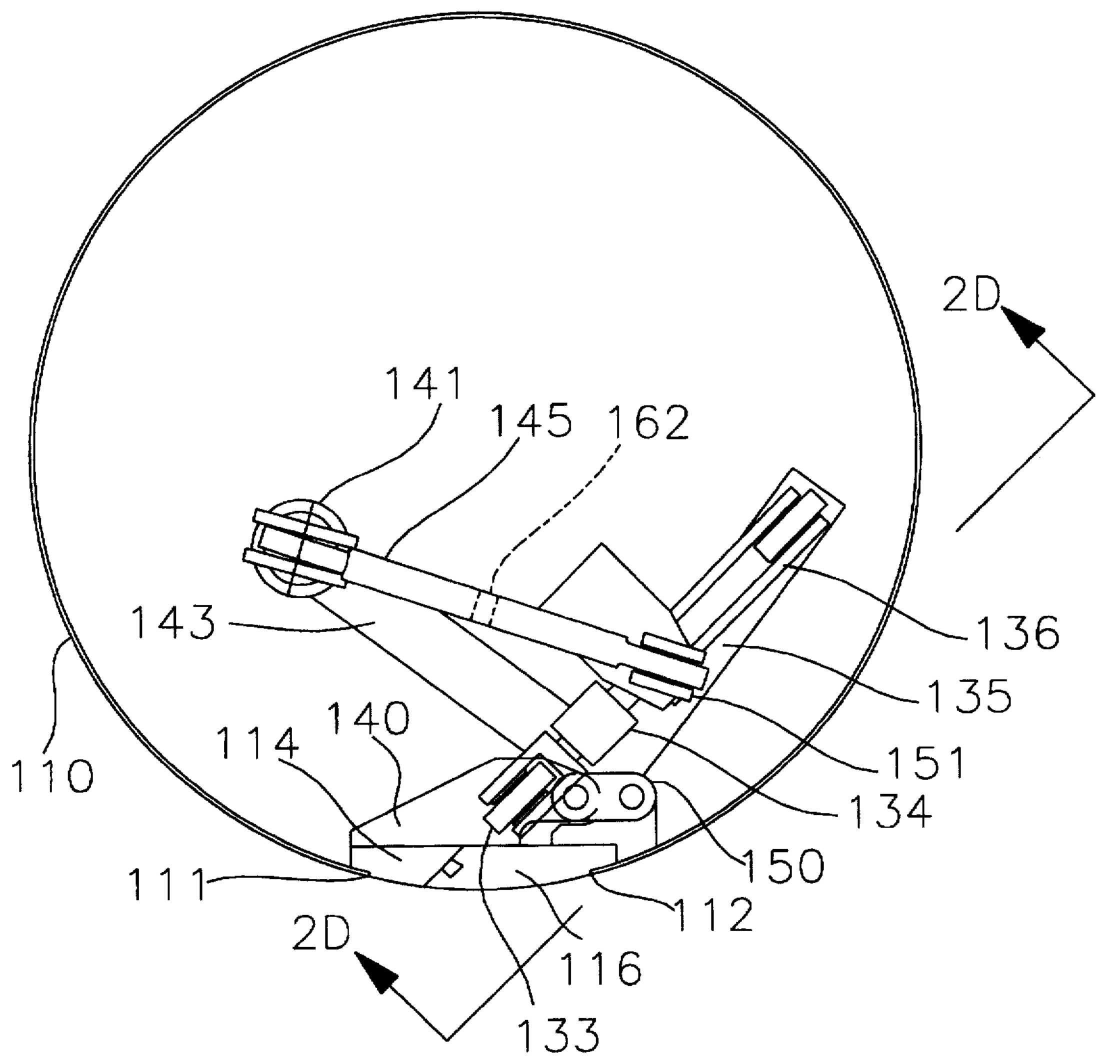
FIG. 2B shows a top view with the gate closed with a connecting arm being omitted to show underlying structure.
Figure 2C:
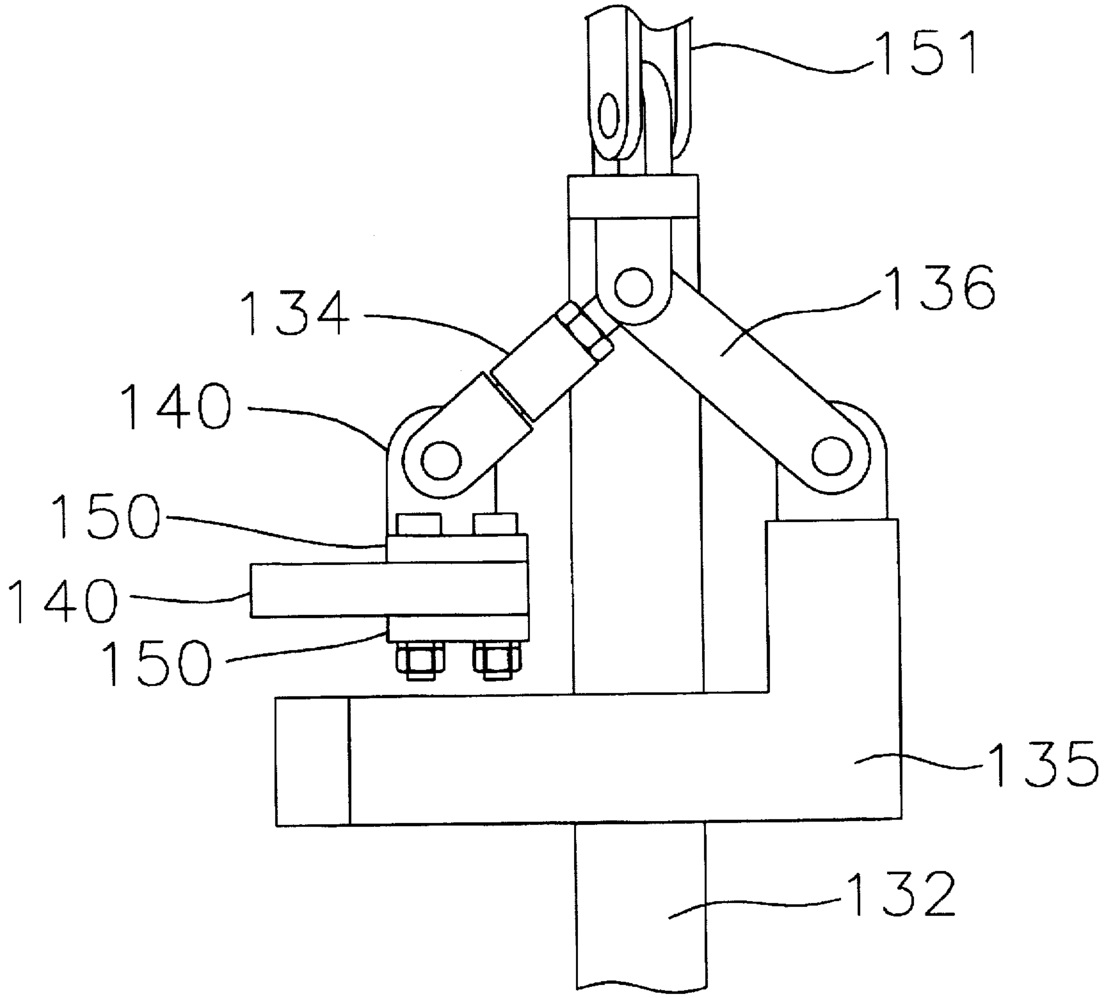
FIG. 2C shows a fragmentary view of the collapsing links in the collapsed position.
Figure 2D:
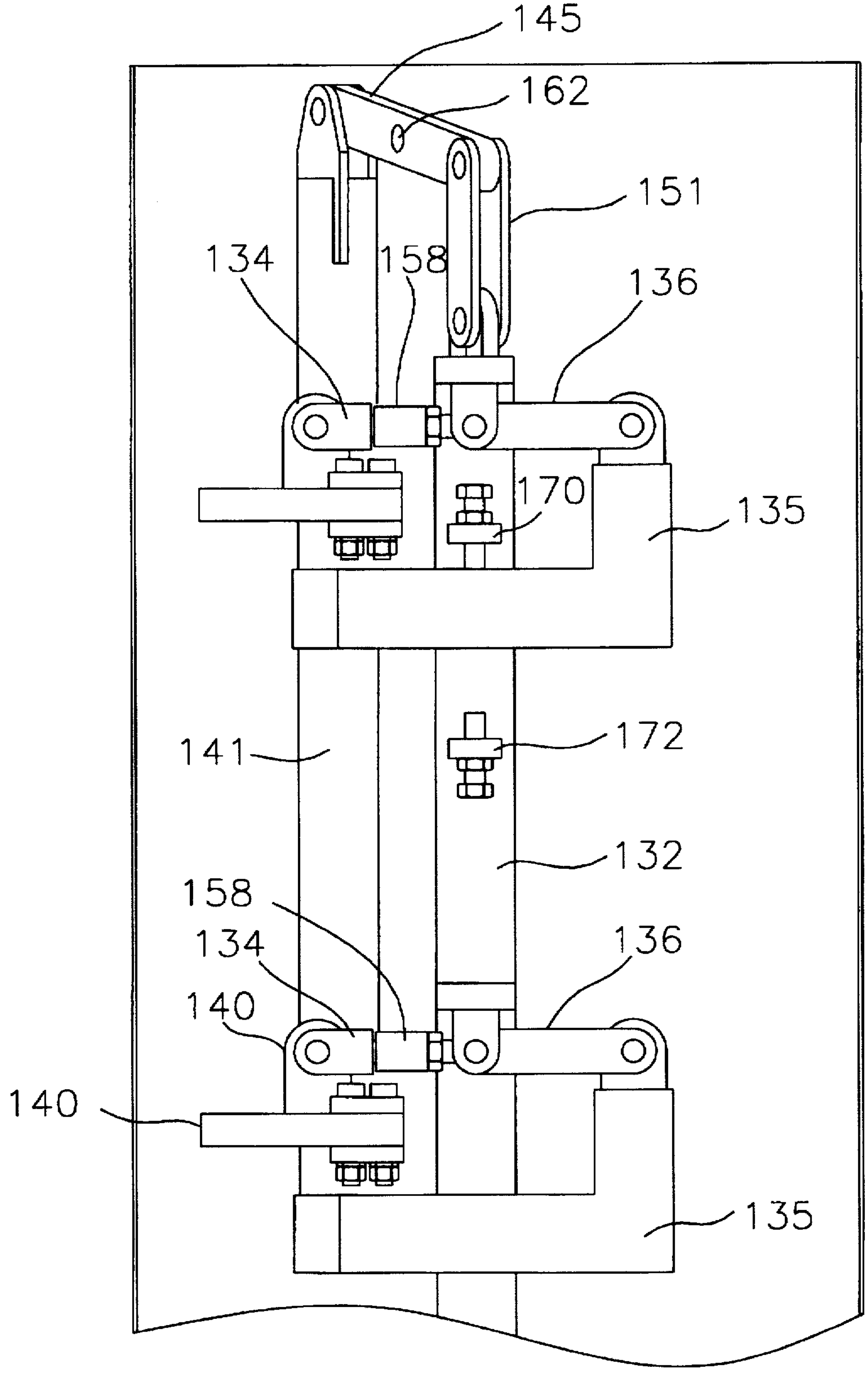
FIG. 2D shows a longitudinal fragmentary view with the links in the extended position along lines D—D in FIG. 2B.

In a suitable embodiment as seen in FIGS. 1A and 1B, two sets of two parallelogram gate links 50, 52, 54, 56 are provided for each collapsing linkage. One parallel set of two links 50, 52 has one end pivotably attached to a horizontal flange 40 secured to the left gate, and the other end pivotably attached to the left side of the gate column on a horizontal flange 42 secured on the gate column. Similarly, the other parallel set of two links 54, 56 has one end pivotably attached to a horizontal flange 44 secured to the right gate, and the other end pivotably attached to the right side of the gate column, also on a horizontal flange 46 secured on the gate column. The parallelogram gate linkages connecting the gate with the gate column correctly orient and move the gates apart from each other when the gate column moves radially outwardly and moves the gates toward each other when the gate column moves radially inwardly. This assures that the mating surfaces on the gates and gate column are parallel when engaged.

From their point of connection to the gate column flanges 42, 46, the gate links are angled away from the line of gate column motion (i.e. from the radial direction). Because of this angle, they push laterally on their respective gates, thereby expanding the gate opening as the gate column moves toward it. As the gate column moves toward the gate opening and the gates are pushed apart, the links pivot, increasing their angle away from the line of motion. The gate links are sized and positioned on the gates and gate column such that when the collapsing linkages are fully extended and approximately parallel to each other, and the gate column is fully inserted into the opening, the gate links have pivoted to be perpendicular to the line of gate motion.

Thus, as seen in FIGS. 1B and 1D, when the actuating column is completely down, the column links are aligned and perpendicular to the gate column. The gate links are parallel to a tangent to the mold core at the gate column. Such alignment provides greatest resistance to collapse of the mold core as wet concrete is introduced into the mold.

When the gate column is fully inserted between the gates, the outer surface of the gate forms a continuation of the outer surface of the steel sheet body of the mold core. The inner wall of each gate and the side walls of the gate column are angled at 45° to a radius of the mold core along which the gate column moves. An elastomeric seal 48 in a groove in each gate provides a seal against the adjacent diagonal wall of the gate column when the gate column is in its outermost position. This keeps wet concrete from passing through the gate.

The apparatus is constructed so that the mold may be expanded and contracted simply by moving the actuating column 32 longitudinally. When the actuating column is moved upwardly, the column linkages collapse, pulling the gate column out of the gate opening and the gate links provide contraction of the gate opening. When the actuating column is moved downwardly, the column linkages extend, pushing the gate column toward the gate opening and the gate links force the gates open to accept insertion of the gate column. No bolts, wedges, or other like hardware need be assembled or removed to expand or contract the mold.

This configuration is especially desirable because a single actuation point 62 can be provided on the actuating column. After a pipe is cast, a hoist is attached to this actuation point. When the mold is raised via this point 62, the collapsing linkages are forced to collapse, causing the mold to contract and become free of the cast concrete surface. Continued lifting at this point raises the mold out of the pipe. Preferably, the actuation point is on the longitudinal axis containing the center of gravity of the mold. If this is the case, the mold is pulled straight out of the pipe, rather than pulled out at an angle.

Because of the presence of the expanding and contracting mechanism, the gates and gate column, the center of gravity of the mold is not on the central axis, but is shifted toward the gate opening. The actuation column, therefore, is not on the central axis, but is shifted toward the gates by making the front column link 36 shorter than the rear column link 34. As the gate opens, shifting the center of gravity more toward the central axis, the actuating column also shifts toward the central axis. Preferably, the front column link 36 has a threaded turnbuckle 58 to allow adjustments in its length so that weight distribution about the actuation point and gate mating characteristics can be precisely controlled.

Another desirable feature is provided by this configuration. When the mold is resting on a base ring, the weight of the actuating column 32 itself tends to pull down on the collapsing links. If the column 32 is simply made heavy enough relative to the force required to expand the sheet metal making up the mold body, this weight can force the collapsing links to extend, and thereby force the gate column into the gate opening. In this way, merely setting the mold down on a base ring in preparation for pipe casting is sufficient to expand and seal the mold.

In this embodiment a latch is employed for retaining the actuating column in its lowermost position with the mold core "closed" in the form of a cylinder. This is useful for handling the mold at other times when not being set up for receiving concrete. A hook 68 at the top of the actuating column engages a stop 74 on the top of the backbone structure of the core. A latch handle 76 retains the hook on the stop when the handle is in its closed position as illustrated in solid lines in FIG. 1A. The hook is released when the handle is pivoted to an open position as shown in phantom. A tension spring 78 biases the latch toward its closed position. The latch handle is made thick enough that it can also engage the hook when the actuating column is raised as illustrated in FIG. 1C, thus holding the mold core in its collapsed or open position. The stop for the hook also engages the top of the actuating column to prevent it from being lifted above the position illustrated in FIG. 1C.

The gate structure in this embodiment is essentially a three-piece structure, two edge gates and a gate column that fits between the gates with the respective mating surfaces engaged.

FIGS. 2A–2D illustrate a second embodiment of gated core mold having a two piece gate structure. This embodiment also comprises an approximately cylindrical piece of sheet steel 110 with a narrow longitudinal split forming left and right edges 111, 112 parallel to the mold central axis. When this cylindrical sheet is in a relaxed state, however, it deforms such that a spiral shape is produced, with the left edge slightly closer to the central axis than the right edge.

Reference numerals in the drawings of FIG. 2 correspond for like parts to the reference numerals used in FIG. 1, plus 100. In other words, the steel sheet forming the core mold body is designated with numeral 10 in FIG. 1 and as 110 in FIG. 2. Similarly, the numerals in FIG. 3 correspond to those in FIG. 1, plus 200.

Welded on the mold inner surface along each edge are left and right gates 114, 116 of thicker steel, which run the length of the mold, and which extend somewhat beyond the edges of the sheet 110. The gates are contoured on their outer surface with a recess substantially equal in depth to the thickness of the sheet steel comprising the mold such that the vertical seam created by the gate/mold overlap is minimized. In addition, the outer surface of that portion of the gates which extend beyond the edges of the sheet steel are contoured to continue the approximately cylindrical surface formed by the mold body sheet. The gate inner surfaces are substantially flat.

The width and extension of the gates is such that when the mold is in its relaxed slightly spiral state, the outer surface of the left gate is adjacent to the inner surface of the right gate.

The gates also have complementary mating surfaces 118, 120 which are not touching when the mold is in the relaxed state. However, when the mold contour is forced into its original cylindrical shape, the mating surfaces abut each other, forming a closed cylinder. To prevent leakage of wet concrete into the interior of the core mold, it is preferable to provide a seal 148 on the mating surface of one of the gates, preferably the outer or right gate. Preferably, the surfaces 118, 120 are angled such that the seam created by them is angled about 45° relative to the plane bisecting the mold through the gate opening. This minimizes binding when the left gate moves relative to the right gate during mold expansion and contraction.

The left and right gates are connected by a plurality of gate links 150 which pivot in planes transverse to the mold central axis. These gate links are attached to hinge brackets 144, 140 welded to the right and left gates respectively. Several hinge brackets are provided, equally spaced along the length of the mold so that the entire length of the gates is connected. To change from the contracted to the expanded configuration, the left gate must be pushed out so that its mating surface abuts the mating surface of the right gate. When the left gate is forced out, it follows the swing motion of the gate link 150 as it pivots relative to the right gate.

To force the left gate outward and expand the mold, a plurality of collapsing linkages 160 are provided which connect the bracket 140 on the left gate to an arm 135 welded to the right gate which extends inwardly approximately along the plane defined by the angled seam created by the gate mating surfaces 118, 120. This collapsing linkage connection is made through a longitudinally extending actuating column 132 so that lowering the actuating column extends the collapsing linkages, thereby pushing the left gate outward, abutting the mating surfaces, and closing the gate opening.

Each collapsing linkage comprises two column links 134, 136 one end of each being pivotably connected to the same point on the actuation column. The other end of the left column link 134 is pivotably connected to the vertical bracket 133 secured to the left gate, whereas the other end of the right column link 136 is pivotably connected to the extending L-shaped arm 135 attached to the right gate 116. In this way, when the actuating column is raised, each linkage collapses, pulling the left gate inward relative to the right gate. When the actuating column is lowered, each linkage extends, forcing the left gate outward.

Because the right gate arm 135 extends inwardly along the plane defined by the gate mating surfaces, the collapsing linkages also lie approximately in this plane, i.e. at 45° from a radial plane. This ensures that gate motion also occurs in line with this diagonal plane, creating smooth mating action and a minimum of binding or interference of the gates with each other during the expansion and collapse of the mold.

As is the case with the first described embodiment, this configuration is especially desirable because an actuation point 162 can be provided for attachment of a hoist to lift the mold out of a cast pipe. This actuation point is connected to the actuating column 132 so that when the mold is raised by this point 162, the collapsing linkages will be forced to collapse, causing the mold to contract and become free of the cast concrete surface. Continued lifting at this point will raise the mold out of the pipe as needed.

Once again, it is preferable for the actuation point to be on the longitudinal axis containing the center of gravity of the mold. If this is the case, the mold will be pulled straight out of the pipe, rather than pulled out at an angle. Because the collapsing linkage mechanism and its associated actuation column are in the angled plane approximately defined by the gate mating surfaces, the actuating column 132 is neither on the central axis nor on the axis containing the mold center of gravity. For this reason, it is preferable to provide an actuation point which is not at the top of the actuating column as in the first described embodiment.

This is created by further providing a secondary column 141 which extends upward from the end of a secondary arm 143 rigidly attached to the right gate. In contrast with the extending L-shaped arms 135, several of which are provided along the length of the mold, only one secondary arm 143 is provided near the top of the mold. The secondary arm is oriented such that the plane joining the secondary column and the actuating column approximately intersects the longitudinal axis which contains the mold center of gravity. A connecting arm 145 is provided in this plane, pivotably connected at one end to the secondary column and at the other end to the actuating column by way of a lifting link 151. The actuation point 162, is on this connecting arm 145 at that point where the connecting arm most nearly intersects the axis containing the mold center of gravity. In this way, the actuating column is moved upward by pulling up on an actuation point which is on the proper longitudinal axis and the mold core can be lifted straight up via the actuation point.

Similar to the first embodiment, it is preferable for one of the column links 134 to have a threaded turnbuckle 158 to allow adjustments in its length so that weight distribution about the actuation point can be precisely controlled.

As in the first embodiment, when the mold is resting on a base ring, the weight of the actuating column itself tends to pull down on the collapsing linkages. If this column is heavy enough relative to the force required to expand the sheet metal making up the mold body, this weight can force the collapsing links to extend and thereby force the left gate outward to mate with the right gate. In this way, merely setting the mold down on a base ring in preparation for pipe casting is sufficient to expand and seal the mold. To stop the actuating column at the desired upper and lower positions, two stops 170, 172 are attached to the actuating column at suitable distances above and below one of the gate arms 135.

The invention may also be embodied in an external mold, shown in FIG. 3. As in the embodiment shown in FIG. 1, this embodiment comprises an approximately cylindrical piece of sheet steel 210 with a narrow longitudinal split forming left and right edges 211, 212 parallel to the mold central axis. Because this mold is for the external surface of the pipe, it needs to expand after the pipe is cast, rather than contract as was the case with the two previously discussed embodiments of core mold. Therefore, when the cylindrical sheet 210 is in a relaxed state, it deforms slightly such that the two edges are farther apart than they are when the mold contour is forced into the shape it would have if an omitted strip were present.

Welded onto the outer surface of the mold along each edge are left and right gates 214, 216 of thicker steel, which run the full length of the mold, and which extend somewhat beyond the edges of the sheet. The width of the gates is such that when the mold body is in its relaxed state, they almost bridge the gap between the edges. The gates are contoured on their inner surface with a recess substantially equal in depth to the thickness of the sheet steel comprising the mold body such that the vertical seam created by the gate/mold overlap is minimized. In addition, the inner surface of that portion of the gates which extend beyond the edges of the sheet steel are contoured to continue the approximately cylindrical surface formed by the mold body. The gate outer surfaces are substantially flat.

The gates also have complementary mating surfaces 218, 220 which are not touching when the mold is in the relaxed state. However, if the mold contour is forced into its original cylindrical shape by pushing the gates together, the mating surfaces abut each other, forming a closed cylinder. To prevent leakage of wet concrete into the interior of the core mold, it is preferable to provide an elastomeric seal 248 on the mating surface of one of the gates. Preferably, the surfaces form a tongue and groove joint, one being tapered to fit into a complementary indentation on the other. In this case, the seal may be provided in the bottom of the indentation.

Figure 3A:
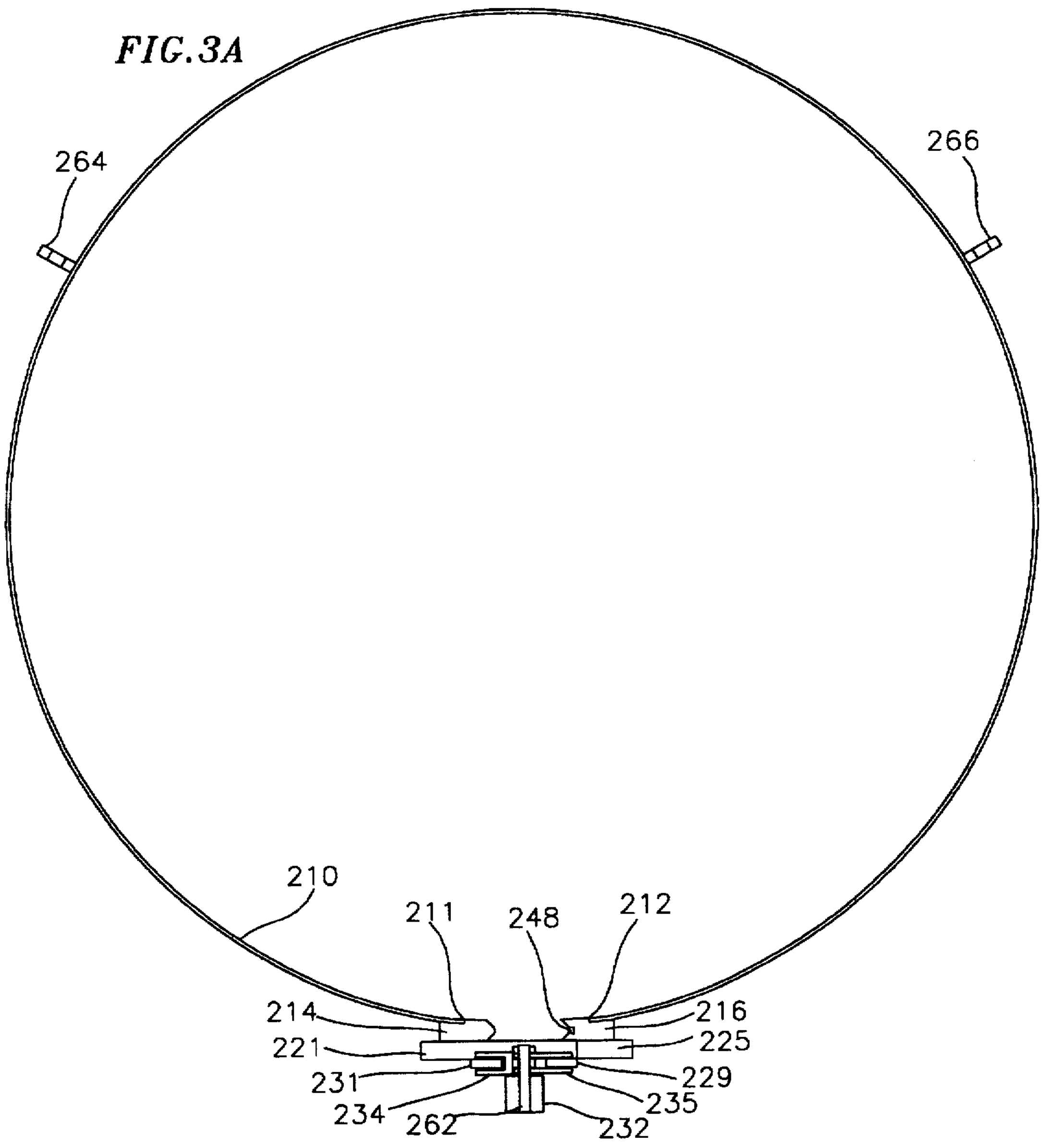
FIG. 3A is a top view of the mold with the gate closed, showing the lifting points.
Figure 3B:
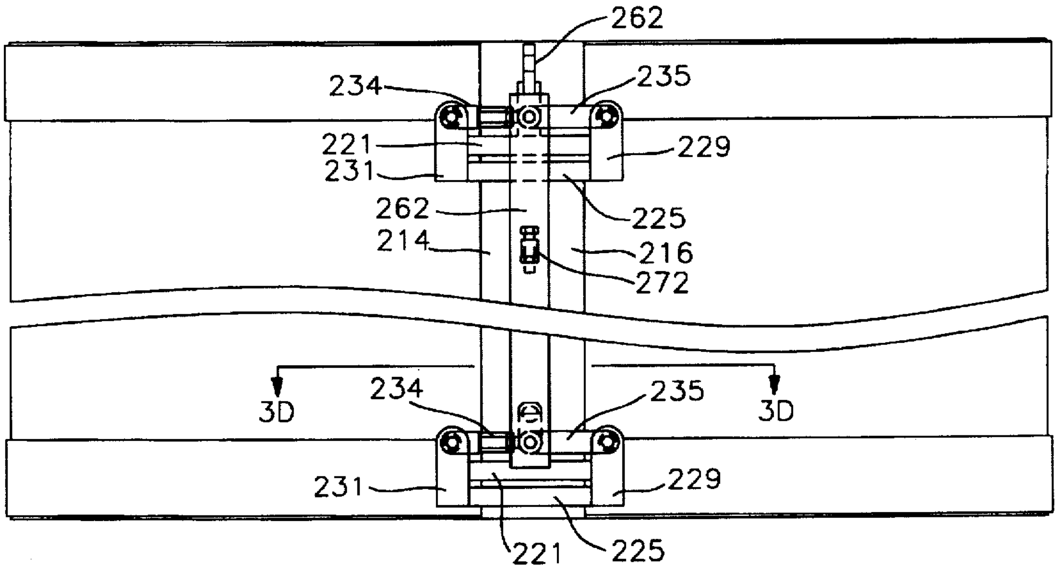
FIG. 3B shows a side elevation view of the gate with the collapsing links in the extended position.
Figure 3C:
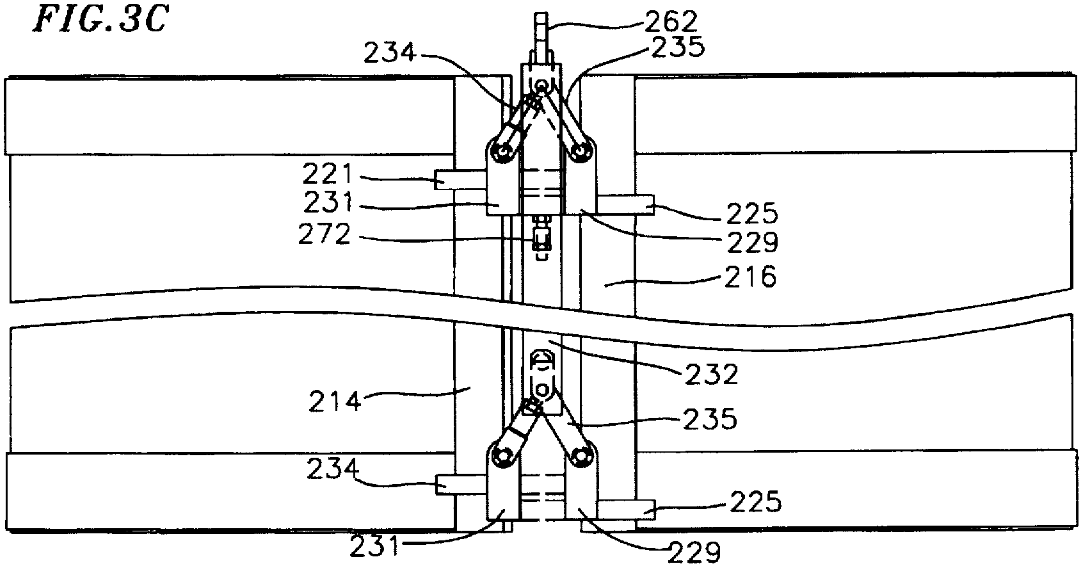
FIG. 3C shows the side elevation view of the gate with the collapsing links in the collapsed position.
Figure 3D:
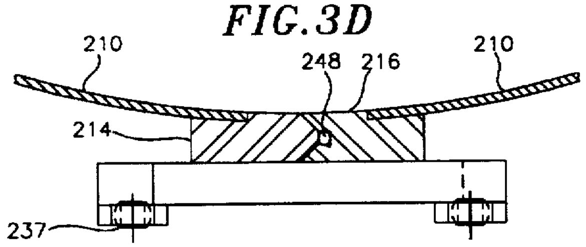
FIG. 3D is a fragmentary cross-sectional view of the gate with the gate closed.
Figure 3E:
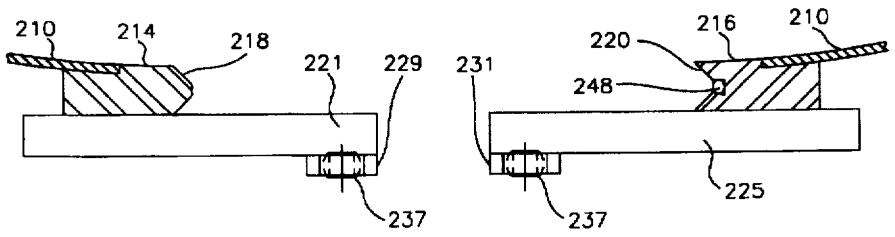
FIG. 3E is a fragmentary cross-sectional view of the gate with the left and right gates separated.
Figure 3F:
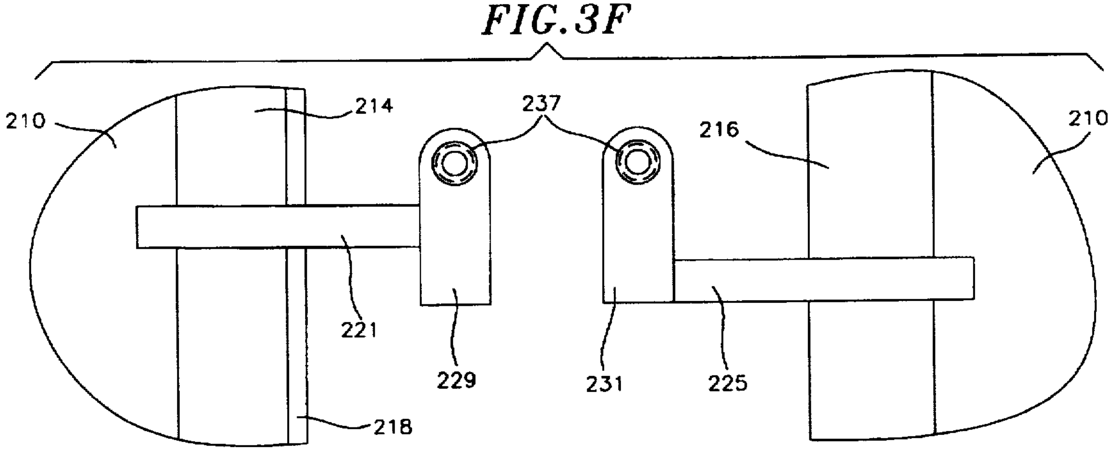
FIG. 3F is a fragmentary side elevation of one set of gate linkage supports with the left and right gates separated.

Attached to each gate are a plurality of linkage supports, axially positioned in pairs along the length of the mold. The left linkage support is comprised of a rectangular bar 221 welded to the outside of the left gate and extending approximately horizontally across the gate opening. The right linkage support is comprised of a rectangular bar 225, welded to the outside of the right gate, also extending approximately horizontally across the gate opening. The two linkage supports are positioned and sized relative to each other such that the bar 225 of the right linkage support fits past the bar 221 of the left linkage support when the mold is in the relaxed position. These bars are slightly spaced apart so that there is no binding when the mold is opened or closed. At the outer end of each gate linkage bar there is a vertical plate 229, 231. When the bars are overlapped as illustrated in FIG. 3D, the left gate vertical plate 229, is now on the right, and the right gate vertical plate 231, is now on the left. With this configuration, the mold may be contracted in preparation for pipe casting if the vertical plate 231 on the right gate is pushed further left, and the vertical plate 229 on the left gate is pushed further right.

To perform the expansion and contraction of the mold, a plurality of collapsing linkages 260 are pivotably attached to the vertical plates 229, 231 by spherical bearings 237. Similar to the above described embodiments, this collapsing linkage connection is made through a longitudinally extending actuating column 232 so that lowering the actuating column extends the collapsing linkages, thereby pushing the vertical plates outward, pushing the gates together, abutting the mating surfaces, and closing the gate opening.

Each collapsing linkage comprises two links 234, 236 one end of each being pivotably connected to a common point on the actuating column 232. The other end of a left link 234 is pivotably connected to the vertical plate 231 on the right gate, whereas the other end of the right link 236 is pivotably connected to the vertical plate 229 on the left gate. Thus, the bar connected to the right gate and the bar connected to the left gate cross each other so that a right portion of the linkage is connected to the left bar and a left portion of the linkage is connected to the right bar. In this way, when the actuating column 232 is raised, each linkage collapses, pulling the vertical plates together and pushing the gates apart. When the actuation column is lowered, each linkage extends, thereby forcing the gates together. The crossover of the bars 221, 225 on the gates effectively reverses the action caused by the actuating column, enlarging the outer mold upon lifting instead of contracting the mold as in the mold cores described above and illustrated in FIGS. 1 and 2.*

As before, a configuration such as this is especially desirable because several lifting points 262, 264, 266 can be provided for attachment of a hoist to lift the mold off of a cast pipe. One such point 262 is connected to the actuating column 232 so that when the mold is raised by this point, the collapsing linkages will be forced to collapse, causing the mold to expand and become free of the cast concrete surface. Continued lifting will raise the mold off of the pipe as needed.

For an external mold, it is preferable to provide one or more hoist attachment points in addition to the one attached to the actuating column, with all points spaced symmetrically around the outer surface of the mold body, rather than configure a system with a single hoist attachment point on the axis containing the mold center of gravity. If this is the case, the mold may be pulled straight out of the pipe, rather than pulled up at an angle. The cable or chain connected to the actuation point 232 can be slightly shorter than the other two lifting cables so as to lift the outer mold straight up after the actuating column has moved upward to release the mold.

Similar to the other described embodiments, it is preferable for one of the links 234 to have a threaded turnbuckle 258 to allow adjustments in its length so that weight distribution and gate mating characteristics can be precisely controlled.

As in the first embodiment, when the mold is resting on a base ring, the weight of the actuating column 232 itself will tend to pull down on the collapsing links. If the actuating column is heavy enough relative to the force required to expand the sheet metal making up the mold body, this weight can force the collapsing links to extend, and thereby force the gates together. In this way, merely setting the mold down on a base ring in preparation for pipe casting is sufficient to expand and seal the mold. To stop the actuating column at the desired upper and lower positions, two stops are attached to the actuating column suitable distances above and below the top pair of linkage supports (only one of the stops 272 is illustrated in FIGS. 3B and 3C.

It is apparent that there are many variations and modifications which may be made to this invention without departing from its spirit or scope, which is defined by the following claims and their equivalents.

What is claimed is:

1. A vertical mold for casting concrete pipe sections comprising:

- an approximately cylindrical body of sheet metal with a vertical longitudinal split forming left and right edges;
- a substantially rigid strip secured longitudinally along each edge forming left and right gates along the left and right edges, respectively, the gates comprising mating surfaces for closing the mold when the mold is prepared for casting a pipe;
- a longitudinally extending actuating column;
- an actuation point for moving the actuating column longitudinally; and
- a plurality of collapsing linkages, one end of each linkage being pivotably attached to the actuating column and the other end being connected to the gates for collapsing the linkage and opening the gates when the actuating column is lifted vertically, and for extending the linkage and closing the gates when the mold is set down on the end opposite the actuation point.

2. The mold of claim 1 wherein the actuation point is located at the top of the actuating column and the actuating column is located substantially along the longitudinal axis containing the center of gravity of the mold.

3. The mold of claim 1 wherein the actuation point is located on a connecting arm pivotably connected to both the top of the actuating column and the mold body, the connecting arm intersecting the longitudinal axis containing the center of gravity of the mold, the actuation point being on the connecting arm substantially at the intersection with the axic containing the center of gravity of the mold.

4. The mold of claim 1 comprising a plurality of lifting points, one of which is the actuation point, the actuation point being located on the actuating column, the lifting points being positioned substantially symmetrically around the mold body.

5. The mold of claim 1 further comprising means for adjusting the length of a link in the linkage after mold assembly.

6. The mold of claim 1 wherein the mating surfaces abut each other when the mold is closed for casting a pipe.

7. The mold of claim 1 wherein the mating surfaces are at an acute angle to a radius of the mold.

8. The mold of claim 1 further comprising a radially movable gate column connected by way of the linkages to the actuating column and to the gates and wherein the mating surfaces on the gates abut mating surfaces on the gate column when the mold is closed for casting a pipe.

9. The mold of claim 1 wherein each linkage comprises a pair of parallelogram gate links connecting each gate with the gate column for moving the gates apart from each other when the gate column moves radially outwardly and moving the gates toward each other when the gate column moves radially inwardly.

10. A core mold for casting concrete pipe sections comprising:

- an approximately cylindrical body of sheet metal with a longitudinal split forming left and right edges;
- substantially rigid strips secured longitudinally along each edge to form left and right gates with facing non-abutting surfaces;
- a longitudinally extending gate column with left and right mating surfaces, the left mating surface being complementary to the left gate and the right mating surface being complementary to the right gate;
- a longitudinally extending actuating column;
- an actuation point for moving the actuating column longitudinally;
- a longitudinally extending backbone secured to the inner surface of the mold, approximately diametrically opposite the gates;
- a plurality of collapsing linkages, each comprising a front link pivotably attached to both the gate column and the actuating column, a rear link pivotably attached to both the backbone and the actuating column, the linkages collapsing when the actuating column is moved longitudinally in one direction, and extending when the actuating column is moved longitudinally in the other direction, the mating surfaces of the gate column being engaged to the left and right gate surfaces when the links are in the extended position and being disengaged from the left and right gate surfaces when the links are in the collapsed position.

11. The mold of claim 10 wherein the links collapse when the mold is lifted by the actuation point, and wherein the links extend when the mold rests vertically on the end opposite the actuation point.

12. The mold of claim 10 wherein the actuating column is located substantially along the longitudinal axis containing the center of gravity of the mold and the actuation point is located on the actuating column.

13. The mold of claim 10 wherein each linkage further comprises a gate link connecting each gate with the gate column for moving the gates apart from each other when the gate column moves radially outwardly and moving the gates toward each other when the gate column moves radially inwardly.

14. The mold of claim 10 wherein each linkage further comprises a pair of parallelogram gate links connecting each gate with the gate column for moving the gates apart from each other when the gate column moves radially outwardly and moving the gates toward each other when the gate column moves radially inwardly.

15. A vertical core mold for casting concrete pipe comprising:

a metal sheet in the form of a cylinder having a vertical longitudinal split forming spaced apart left and right longitudinal edges;

a rigid strip secured along each longitudinal edge of the sheet forming left and right gates, each gate including a mating surface at an angle to a radius of the cylindrical sheet between the axis of the cylinder and the gates;

a vertical gate column extending parallel to the gates, the gate column including a pair of mating surfaces complementary to the mating surfaces on the respective gates;

a vertical actuating column extending parallel to the gates;

a plurality of collapsing linkages, each linkage including a front link pivotably connected between the actuating column and the gate column and a rear link pivotably connected between the actuating column and a portion of the sheet on the opposite side of the cylinder from the gates, the front and rear links being pivotable in a vertical direction; and means for moving the actuating column in a vertical direction for shifting the pair of links between (a) a closed position where the links are approximately parallel when the actuating column is in a lower position and the gate column is between the gates with the respective mating surfaces engaged, and (b) an open position where the links are not parallel when the actuating column is an upper position and the gate column is withdrawn from between the gates.

16. An mold as recited in claim 15 wherein each linkage comprises:

a left linkage between the gate column and the left gate and a right linkage between the gate column and the right gate, the left and right linkages being pivotable in a horizontal direction for moving the gates apart when the actuating column is in the lower position and moving the gates together when the actuating column is in the upper position.

17. A mold as recited in claim 16 wherein the left and right linkages are each parallelogram linkages.

18. A mold as recited in claim 15 wherein the actuating column is located substantially along the longitudinal axis containing the center of gravity of the mold.

19. A core mold for casting concrete pipe sections comprising:

an approximately cylindrical body of sheet metal with a longitudinal split forming left and right edges;

substantially rigid strips with complementary abutting faces secured longitudinally along each edge to form left and right gates;

a longitudinally extending actuating column;

an actuation point for moving the actuating column; and a plurality of collapsing links, a first link pivotably attached to both the left gate and the actuating column, a second link pivotably attached to both the right gate and the actuating column, the linkages collapsing when the actuating column is moved longitudinally in one direction, and extending when the lifting column is moved longitudinally in the other direction, the complementary faces being engaged when the links are extended and being disengaged when the links are collapsed.

20. The mold of claim 19 wherein the complementary surfaces are at an acute angle to a radius of the mold and the first and second links are aligned with the complementary surfaces.

21. The mold of claim 19 wherein the links collapse when the mold is lifted by the actuation point, and wherein the links extend when the mold rests vertically on the end opposite the actuation point.

22. The mold of claim 19 wherein the actuation point is located on a connecting arm pivotably connected to both the actuating column and the mold body, the connecting arm intersecting the longitudinal axis containing the center of gravity of the mold, the actuation point being on the connecting arm substantially at the intersection with the axis containing the center of gravity of the mold.

23. The mold of claim 19 further comprising a pivotable link interconnecting the right and left gates.

24. The mold of claim 19 further comprising a secondary column rigidly connected to one of the gates, a connecting arm pivotably connected to both the secondary column and the actuation column, the actuation point being on the connecting arm substantially at an intersection with a longitudinal axis containing the center of gravity of the mold.

25. A vertical core mold for casting concrete pipe comprising:

a metal sheet in the form of a cylinder having a vertical longitudinal split forming spaced apart left and right longitudinal edges;

a rigid strip secured along each longitudinal edge of the sheet forming left and right gates, each gate including a mating surface at an acute angle to a radius of the cylindrical sheet between the axis of the cylinder and the gates;

a vertical actuating column extending parallel to the gates;

a plurality of collapsing linkages, each linkage including a right link between the actuating column and the right gate and a left link between the actuating column and the left gate, the left and right links being pivotable in a vertical direction; and means for moving the actuating column in a vertical direction for shifting the pair of links between (a) a closed position where the links are approximately parallel when the mating surfaces of the gates are engaged, and (b) an open position where the links are not parallel when the mating surfaces of the gates are not engaged.

26. A mold as recited in claim 25 wherein the left and right links are aligned with the mating surfaces for moving one of the gates at an acute angle to the radius.

27. A mold as recited in claim 25 comprising a connecting arm pivotably connected to both the actuating column and one of the gates, the connecting arm intersecting a longitudinal axis containing the center of gravity of the mold, and a lifting point on the connecting arm substantially at the intersection with the axis containing the center of gravity of the mold.

28. A mold as recited in claim 25 further comprising a pivotable link interconnecting the right and left gates.

29. A mold as recited in claim 25 further comprising a secondary column rigidly connected to one of the gates, a connecting arm pivotably connected to both the secondary column and the actuating column, the actuation point being on the connecting arm substantially at an intersection with a longitudinal axis containing the center of gravity of the mold.

30. An external mold for casting concrete pipe sections comprising:

an approximately cylindrical body of sheet metal with a longitudinal split having spaced apart left and right edges;

substantially rigid strips with complementary abutting faces secured longitudinally along each edge to form left and right gates;

a longitudinally extending actuation column;

an actuation point for moving the actuating column; and a plurality of collapsing linkages, each linkage comprising a first link pivotably attached to both the left gate and the actuating column and a second link pivotably attached to both the right gate and the actuating column, the linkages collapsing when the actuating column is moved longitudinally in one direction, and extending when the lifting column is moved longitudinally in the other direction, the complementary abutting faces disengaging when the links collapse, and engaging when the links extend.

31. The mold of claim 30 wherein the links collapse when the mold is lifted by the actuation point, and wherein the links extend when the mold rests vertically on the end opposite the actuation point.

32. The mold of claim 30 comprising a plurality of lifting points, one of which is the actuation point, the actuation point being located on the actuating column, the lifting points being positioned substantially symmetrically around the mold body.

33. The mold of claim 30 further comprising a right bar connected to the right gate and a left bar connected to the left gate, the left and right bars crossing each other so that a right portion of the linkage is connected to the left bar and a left portion of the linkage is connected to the right bar.

34. An external mold for casting concrete pipe comprising:

a metal sheet in the form of a cylinder having a vertical longitudinal split forming spaced apart left and right longitudinal edges;

a rigid strip secured along each longitudinal edge of the sheet forming left and right gates, each gate including a mating surface complementary to a mating surface on the other gate;

a vertical actuating column extending parallel to the gates;

a plurality of collapsing linkages, each linkage including a right link between the actuating column and the left gate and a left link between the actuating column and the right gate, the left and right links being pivotable in a vertical direction; and means for moving the actuating column in a longitudinal direction for shifting the pair of links between (a) a closed position where the links are approximately parallel when the mating surfaces of the gates are engaged, and (b) an open position where the links are not parallel when the mating surfaces of the gates are not engaged.

35. A mold as recited in claim 34 comprising a plurality of lifting points substantially symmetrically located around the mold, one of the lifting points being connected to the actuating column for opening the gates and lifting the mold.

36. A mold as recited in claim 34 further comprising a right bar connected to the right gate and a left bar connected to the left gate, the left and right bars crossing each other so that he right link is connected to the left bar and the left link is connected to the right bar.

* * * * *